Patented July 4, 1967

3,329,646
PEROXIDIZED ATTRITED CARBON BLACK AND USES THEREOF
Albert M. Gessler, Cranford, N.J., assignor to Esso Research and Engineering Company, a corporation of Delaware
No Drawing. Filed Oct. 31, 1963, Ser. No. 320,521
11 Claims. (Cl. 260—41)

This invention relates to an improved modified carbon black and its use in rubber compositions. More specifically, it relates to the severe attrition of carbon black in conjunction with its treatment with peroxides to provide an improved filler for selected rubbers.

It is known in the art that carbon black may be severely attrited in an oxygen-containing atmosphere to produce a material which may be advantageously blended with certain kinds of rubbers. See for example Patent No. 3,024,092 issued on Mar. 6, 1962, to the instant inventor. The carbon black which is so treated is known to be oxygenated, and this is one of several ways of producing oxygenated carbon black. Such oxygenated products are useful when compounded with, for example, butyl rubber; however, when added to a rubber which must be cured with an organic peroxide, it is found that they severely retard the curing of such rubbers. This is probably because the organic peroxides cure by means of the formation of free radicals and the oxygenated carbon black, by means of ionic cleavage, consumes the peroxide and thereby prevents the formation of free radicals which are necessary to the cure system.

It has now been found that selected rubbers which cure in the presence of organic peroxides may be blended with carbon black which has been severely attrited in the presence of peroxides, without retardation in their cure rates. Additionally it has been surprisingly found that such rubbers have improved softness as is shown by their Shore hardness and dynamic modulus, so that when they are used for example in automobile tires, they provide a much softer ride than was heretofore available with such tires.

More specifically, this invention teaches that carbon black may be modified by being subjected to severe attrition and being treated with 0.2 to 10 weight percent, preferably about 1 to 5 weight percent of a peroxide compound, the weight of the peroxide compound being based on the weight of the carbon black. When the peroxide-treated attrited black is compounded with selected peroxide-curable rubbers it is found upon vulcanization of the product that a softer rubber with improved properties results. Approximately 10 to 200 parts by weight of treated carbon black may be used per 100 parts of rubber, although best results are obtained by using 40 to 100 parts of treated black.

The invention may be applied to any kind of carbon black which may be compounded with rubber. Thus although HAF black is preferred, other high structure furnace blacks such as SAF, ISAF, FEF and HMF may be used. Additionally low structure furnace blacks such as Neotex and Regal Blacks may be used as well as thermal blacks (e.g. FT and MT blacks), channel blacks (e.g. MPC and EPC), and acetylene black (e.g. Shawinigan black).

The conditions for the severe attrition of the carbon black are generally described in U.S. Patent No. 3,024,092. The most convenient apparatus for accomplishing this attrition is a ball mill.

As the amount of attrition desired is very severe, it is exigent to use steel balls or some other suitably high density grinding medium having a specific gravity of at least 7, and generally the balls should be large enough in diameter to give high impact force. Thus, in laboratory ball mills, one may use steel balls of ¼ to 1 inch. Commercially even larger sizes may be used such as up to 2 inches in diameter.

The size of the ball mill, the weight of the charge of balls, and its ratio to the weight of carbon black, as well as the speed of rotation of the ball mills, should all be adjusted to give severe ball-milling attrition. The duration of the treatment may vary somewhat according to the various equipment factors mentioned above, as well as with the nature of the particular carbon black to be treated, but generally should be within the range of about one hour to 48 hours, preferably about 5 to 30 hours, for best practical results.

Instead of using ball-milling to effect the desired attrition of the carbon black, other means may be used such as supersonic vibration using either the black alone or the black with an attrition medium such as steel balls, or impingement of black against a surface or target where the black particles are blown at very high velocity against the target. Other attrition processes using hammer action, such as in hammer mill grinding between steel rolls which have been set very tight, e.g. to a clearance of 0.010 inch or less, or other grinding techniques and the like are also suitable.

The carbon black is attrited in the dry state and it is very important that no air be present in the attriting apparatus. Should air be present for example in the ball mill, the attrited black will become oxygenated, and thus useless in the present invention.

It is best to attrit in the presence of a peroxide thus insuring that the active sites on the carbon black which are created by the attrition process become immediately attacked by peroxy radicals. However, it is also possible to attrit in an inert atmosphere such as nitrogen, and then contact the attrited black with the peroxide before it is exposed to air or any other reactive medium.

Any peroxide compound may be used in this invention since it is the peroxy radical per se which is important. Thus organic peroxides such as dicumyl peroxide, ditertiarybutyl peroxide, tertiarybutylhydroperoxide, and dibenzoyl peroxide are suitable as well as inorganic peroxides such as hydrogen peroxide and calcium peroxide. Preferred is dicumyl peroxide.

The rubbers to which this invention is applicable are derived from low pressure, substantially amorphous (having less than about 5 weight percent crystallinity) copolymers of ethylene and other high alpha olefins. The copolymers preferably include $C_3$ to $C_5$ alpha olefins such as propylene, butene-1, and penetene-1. Propylene is particularly preferred as the other alpha olefin. These copolymers are produced by a low pressure process which is by now well known in the art. Details of the process are described generally in the "Scientific American," September 1957, pages 98 et seq.

The ethylene-propylene copolymers in general have a molecular weight of 25,000 to 1,000,000 as determined from viscosity measurements in tetralin solution, according to the method published by G. Moraglio, La Chimica e L'Industria, volume 41, page 984, 1959, and the amount of ethylene in the copolymers can range from 20 to 100 mole percent, but preferably from 30 to 90 mole percent. The copolymers are further characterized by the following properties: densities ranging from 0.85 to 0.90; percentage by weight insoluble in normal heptane at room temperature, ranging from 10 to 40%; and crystallinity content, as determined by X-ray diffraction, ranging from 0 to 15%. The exact values of these physical characteristics depend on the particular composition of the copolymer and the condition of synthesis.

The invention is also applicable to rubbers made from the above copolymers which additionally include a minor amount (about 2 to 10 weight percent) of a third monomer. The third monomer is a diolefin added to make the product more readily curable. Examples of third monomers which may be added are methylene norbornene, and dicyclopentadiene. Thus the phrase "rubber derived from a copolymer of ethylene and a higher alpha olefin" is meant to include the above-described terpolymers.

The rubbers of this invention are cured by conventional methods utilizing an organic peroxide along with a co-agent such as sulfur. A great number of organic peroxides are known in the art to be curing agents for these rubbers and any of them may be used. Dicumyl peroxide is one of the preferred agents.

The invention may be more fully understood by reference to the following examples in which the term "EPR" is used to connote a rubbery ethylene-propylene copolymer.

EXAMPLE 1

The reinforcement of EPR was studied using the formulation given in Table I.

TABLE I.—FORMULATION FOR EPR REINFORCEMENT STUDY

| | | |
|---|---|---|
| EPR [1] | 100.0 | } Masterbatch. |
| Carbon Black | 50.0 | |
| Di Cup 40 HAF [2] | 7.0 | } Curing Agents. |
| Sulfur | 0.3 | |

[1] Ethylene-propylene rubbery copolymer containing 53 mol percent ethylene.
[2] 40% dicumylperoxide in HAF Black.

The masterbatch was mixed in conventional manner on a cool two roll mill. Half of the masterbatch received no further treatment. The other half was hot milled for 10 minutes at 320° F. Curing agents were added finally to each masterbatch on a cool mill, and the resulting vulcanizates were cured for 30 minutes at 320° F.

In this example, carbon black which was ball milled in the presence of a peroxide was compared with non ball milled carbon black and with carbon black which was ball milled in air. As can be seen in Tables II and III below, the use of carbon black attrited in the presence of a peroxide produced a highly superior product with the non heat-treated, and with the heat-treated portions of the masterbatch.

In preparing the ball milled blacks, 350.0 g. portions of the black were dried overnight in an air oven at 300° F. Each of these dried portions was then ball milled for 24 hours in a 1¼ gallon steel assay jar with 22 pounds of ⅝-inch diameter steel balls.

In Table II below, are shown the results for the masterbatch which was not heat treated prior to vulcanization.

TABLE II

| | Run No. | | | | |
|---|---|---|---|---|---|
| | 1 | 2 | 3 | 4 | 5 |
| HAF Black | Standard | Ball Milled, 24 Hours | | | |
| Peroxide [1] on Black | | 0 | 2.5 | 5.0 | 10.0 |
| Percent Bound Rubber | 12.1 | 15.6 | 15.6 | 12.7 | 13.5 |
| Modulus (Lbs./In.²) at— | | | | | |
| 100% | 275 | | 120 | 120 | 130 |
| 200% | 820 | | 160 | 150 | 200 |
| 300% | 1,700 | | 220 | 220 | 350 |
| 400% | 2,615 | | 300 | 320 | 610 |
| 500% | | | 370 | 475 | 935 |
| 600% | | | 470 | 630 | 1,300 |
| 700% | | | 565 | 810 | 1,700 |
| 800% | | | | 975 | 2,050 |
| 900% | | | | | |
| Tensile Strength, Lbs./In.² | 2,925 | 185 | 640 | 1,050 | 2,125 |
| Percent Elongation | 460 | 1,000+ | 800 | 870 | 830 |
| Shore Hardness | 62 | 48 | 52 | 52 | 55 |
| Dynamic Properties: | | | | | |
| (1) $\eta f \times 10^{-6}$, Poises×CPS | 4.50 | | 4.97 | 4.65 | 4.13 |
| (2) $K \times 10^{-7}$, Dynes/Cm.² | 10.7 | | 8.12 | 8.49 | 8.90 |
| (3) Percent Relative Damping | 34.3 | | 46.4 | 42.6 | 37.3 |

[1] 40% dicumyl peroxide in HAF Black.

As can be seen from the preceding table, the non ball milled black (Run No. 1) produced a relatively hard, stiff rubber, as can be seen for example from the Shore Hardness and Dynamic Properties data. The carbon black which was attrited in the absence of a peroxide (Run No. 2) severely retarded the curing (note the low tensile strength) while Runs 3, 4 and 5 produced a cured rubber having "soft" properties.

In Table II below are shown the results of the masterbatch which was heat-treated prior to vulcanization. Results here are similar in effect to those of Table II, and are particularly significant since they show that while there is little or no thermal interaction between the rubber and the blacks of runs 1 and 2, there is considerable thermal interaction between the rubber and the black of this invention (runs number 3, 4 and 5).

TABLE III

| | Run No. | | | | |
|---|---|---|---|---|---|
| | 1 | 2 | 3 | 4 | 5 |
| HAF Black | Standard | Ball Milled, 24 Hours | | | |
| Peroxide [1] on Black | | 0 | 2.5 | 5.0 | 10.0 |
| Percent Bound Rubber | 12.8 | 19.1 | 19.1 | 17.4 | 18.4 |
| Modulus (Lbs./In.$^2$) at— | | | | | |
| 100% | 300 | 120 | 135 | 150 | 170 |
| 200% | 900 | 135 | 175 | 200 | 275 |
| 300% | 1,825 | 185 | 260 | 360 | 525 |
| 400% | 2,760 | 245 | 435 | 625 | 985 |
| 500% | | 350 | 700 | 1,025 | 1,600 |
| 600% | | 465 | 1,025 | 1,450 | 2,285 |
| 700% | | 585 | 1,430 | 1,910 | 2,900 |
| 800% | | 735 | 1,730 | | |
| 900% | | 800 | | | |
| Tensile Strength, Lbs./In.$^2$ | 3,085 | 850 | 1,790 | 2,185 | 3,000 |
| Percent Elongation | 470 | 950 | 835 | 780 | 725 |
| Shore Hardness | 62 | 53 | 55 | 53 | 55 |
| Dynamic Properties: | | | | | |
| (1) $\eta f \times 10^{-6}$, Poises$\times$CPS | 4.43 | | 3.94 | 3.91 | 3.35 |
| (2) $K \times 10^{-7}$, Dynes/Cm.$^2$ | 10.7 | | 8.50 | 8.77 | 8.71 |
| (3) Percent Relative Damping | 33.7 | | 37.1 | 36.0 | 31.9 |
| Heat Treatment Response: | | | | | |
| (1) 300% Modulus, Lbs./In.$^2$ | 125 | | 40 | 140 | 175 |
| (2) 500% Modulus, Lbs./In.$^2$ | | | 330 | 550 | 665 |
| (3) Tensile Strength, Lbs./In.$^2$ | 160 | | 1,150 | 1,135 | 875 |
| (4) Nf, percent | −1.4 | | −20.9 | −16.0 | −18.9 |
| Tensile Product$\times 10^{-4}$ | 145.0 | | 149.5 | 170.4 | 217.5 |
| Tensile Product $\eta f \times 10^2$ | 32.7 | | 37.9 | 43.6 | 64.9 |

[1] 40% dicumyl peroxide in HAF black.

EXAMPLE 2

To show that the improved product of Example 1 was not obtained as a result of the mere inclusion of additional peroxide to the masterbatch, the following data were obtained. Three masterbatches were prepared as follows:

| | 1 | 2 | 3 | |
|---|---|---|---|---|
| EPR [a] | 100.0 | 100.0 | 100.0 | } Masterbatch |
| Attrited HAF Black [b] | 50.0 | 50.0 | | |
| Peroxide Attrited HAF Black [c] | | | 55.0 | |
| Di Cup 40 HAF [d] | | 5.0 | | |

[a] Ethylene-propylene rubbery copolymer containing 53 mol percent ethylene.
[b] HAF black ball milled in steel ball mill for 24 hours.
[c] HAF black ball milled as above in the presence of 10 weight percent of dicumyl peroxide.
[d] 40% dicumyl peroxide in HAF black.

The above masterbatches, after being prepared on a cold mill, were hot milled for 10 minutes at 300–310° F. Following this hot milling, 0.3 parts by weight of sulfur and 7.0 parts of Di Cup 40 HAF (curing agents) were added on the cold mill. The resulting compounds were then cured for 30 minutes at 320° F.

Comparing vulcanizates of the above compounds, the following data were obtained:

| Compound | 1 | 2 | 3 |
|---|---|---|---|
| Modulus (Lbs./In.$^2$) at— | | | |
| 100% | 120 | 100 | 150 |
| 200% | 135 | 135 | 250 |
| 300% | 185 | 200 | 450 |
| 400% | 245 | 320 | 840 |
| 500% | 350 | 520 | 1370 |
| 600% | 465 | 725 | 1915 |
| 700% | 585 | 940 | 2400 |
| 800% | 735 | 1100 | |
| 900% | 800 | | |
| Tensile Strength, Lbs./In.$^2$ | 850 | 1125 | 2600 |
| Percent Elongation | 950 | 835 | 740 |
| Shore Hardness | 53 | 48 | 50 |

As can be seen from the above data only the black of this invention which was attrited in the presence of a peroxide made possible the production of strong, soft vulcanizates.

This invention has been described in connection with certain specific embodiments thereof; however, it should be understood that these are by way of example rather than by way of limitation, and it is not intended that the invention be restricted thereby.

What is claimed is:

1. An improved filler for rubber comprising a carbon black which has been severely attrited in the absence of oxygen and contacted prior to contact with oxygen with 0.2 to 10 wt. percent based on carbon black of an organic peroxide compound.

2. The filler of claim 1 wherein the attrited black is contacted with 1 to 5 wt. percent based on carbon black of a rubber-curing organic peroxide compound.

3. The filler claim 2 wherein the peroxide is dicumyl peroxide.

4. An improved filler for rubber comprising a carbon black which has been severely attrited in the presence of 0.2 to 10 wt. percent based on carbon black of a rubber-curing organic peroxide, said attrition conducted in the absence of oxygen.

5. A method of improving the properties of carbon black as a rubber filler which comprises: severely attriting a carbon black in the absence of oxygen for a period in the range of about 1 to 50 hours and contacting said attrited black prior to its contact with oxygen with 0.2 to 10 wt. percent based on carbon black of an organic peroxide compound.

6. The method of claim 5 wherein the carbon black is attrited in a steel ball mill in the presence of a rubber-curing organic peroxide compound.

7. A peroxide curable composition of matter comprising a rubber derived from the copolymer of ethylene and a higher alpha olefin having incorporated therein 10 to 200 wt. percent based on rubber of a carbon black filler which has been severely attrited in the absence of oxygen and contacted prior to its contact with oxygen with 0.2 to 10 wt. percent based on carbon black of an organic peroxide compound.

8. The composition of claim 7 wherein from 40 to 100 wt. percent of filler is compounded with said rubber and said carbon black filler has been severely attrited in the presence of from 0.2 to 10 wt. percent based upon carbon black of a rubber-curing organic peroxide, said attrition being conducted in the absence of oxygen.

9. A process for producing an improved vulcanizate of a rubber derived from a copolymer of ethylene and a higher alpha olefin which comprises blending said rubber with a carbon black filler which has been severely attrited in the absence of oxygen and contacted prior to contact with oxygen with 0.2 to 10 wt. percent based on carbon black of an organic peroxide compound and curing said blended composition in the presence of an organic peroxide vulcanizing agent.

10. The process of claim 9 wheerin said organic peroxide vulcanizing agent is dicumyl peroxide and said filler is a carbon black which has been severely attrited in the absence of oxygen and contacted prior to contact with oxygen with from 0.2 to 10 wt. percent based on carbon black of dicumyl peroxide.

11. A cured composition of matter comprising an organic peroxide cured elastomeric composition comprising a rubber derived from a copolymer of ethylene and a higher alpha olefin having incorporated therein 10 to 200 wt. percent based on rubber of a carbon black filler which has been severely attrited in the absence of oxygen and contacted prior to contact with oxygen with from 0.2 to 10 wt. percent of a rubber-curing organic peroxide.

References Cited

UNITED STATES PATENTS

| 2,686,107 | 8/1954 | Jordan | 23—209.1 |
| 2,852,486 | 9/1958 | Gessler | 260—41 |
| 3,023,118 | 2/1962 | Donnet | 106—307 |
| 3,024,092 | 3/1962 | Gessler | 23—209.2 |
| 3,036,980 | 5/1962 | Dunham et al. | 260—31.4 |
| 3,141,004 | 7/1964 | Wolf | 260—41.5 |
| 3,178,304 | 4/1965 | Eckert et al. | 106—307 |

FOREIGN PATENTS 638,294    6/1950    Great Britain.

TOBIAS E. LEVOW, *Primary Examiner.*

HELEN McCARTHY, *Examiner.*

S. E. MOTT, *Assistant Examiner.*